United States Patent [19]

Keene et al.

[11] 4,061,053

[45] Dec. 6, 1977

[54] VEHICLE SERVICE BRAKE PEDAL

[75] Inventors: Derek K. Keene; Walter R. Hinde, both of Philadelphia, Pa.

[73] Assignee: Eaton Corporation, Cleveland, Ohio

[21] Appl. No.: 607,179

[22] Filed: Aug. 25, 1975

[51] Int. Cl. ............................................. G05G 1/14
[52] U.S. Cl. ...................................... 74/512; 74/560
[58] Field of Search ............... 74/560, 512; 180/77 R; 192/3 S

[56] References Cited

U.S. PATENT DOCUMENTS

| | | | |
|---|---|---|---|
| 2,042,202 | 5/1936 | Althouse | 192/3 S |
| 2,131,972 | 10/1938 | Ruhstorfer | 74/512 X |
| 2,281,755 | 5/1942 | Dunning | 74/512 X |
| 2,542,410 | 2/1951 | Hedges | 74/560 X |
| 2,620,050 | 2/1952 | Ménard | 192/3 S |
| 3,481,216 | 12/1969 | Noriega | 74/560 X |

Primary Examiner—Samuel Scott
Assistant Examiner—R. Turner
Attorney, Agent, or Firm—Teagno & Toddy

[57] ABSTRACT

A service brake pedal for a stand-up industrial vehicle in which the pedal assumes a level attitude when an operator stands normally on the vehicle with one foot on the pedal and most of his weight applied to the heels of his feet. The service brake pedal is supported by a linkage system which applies a braking force to the service brake system when the operator's weight on the pedal engaging foot is shifted forwardly from his heel. The linkage is arranged to permit essentially all the operator's weight to be selectively applied to the brake system when required.

10 Claims, 4 Drawing Figures

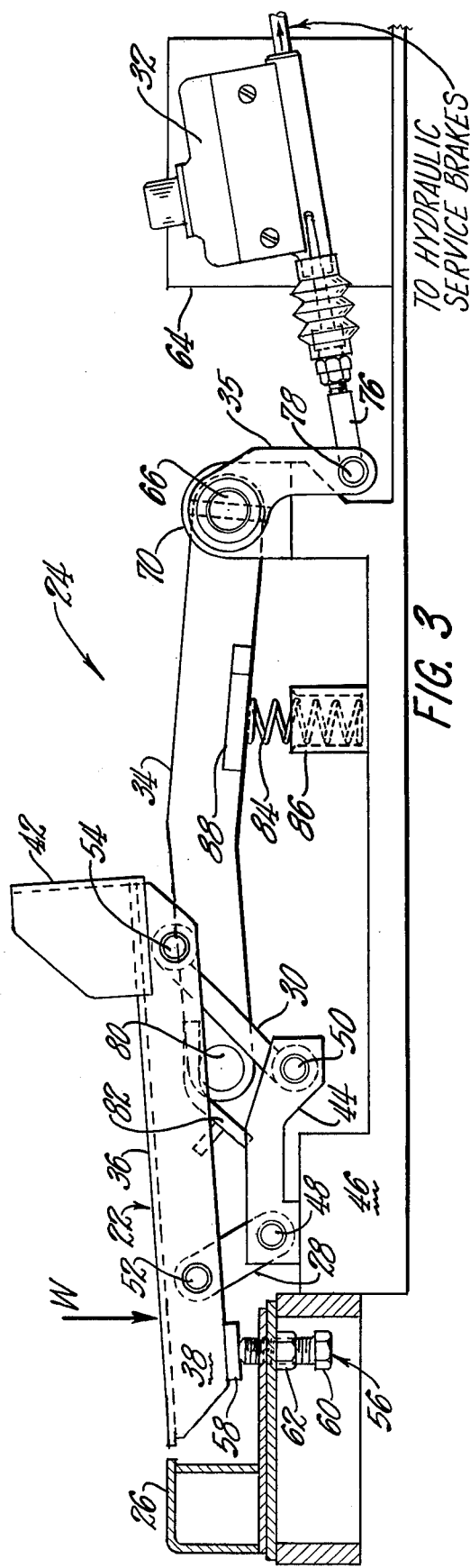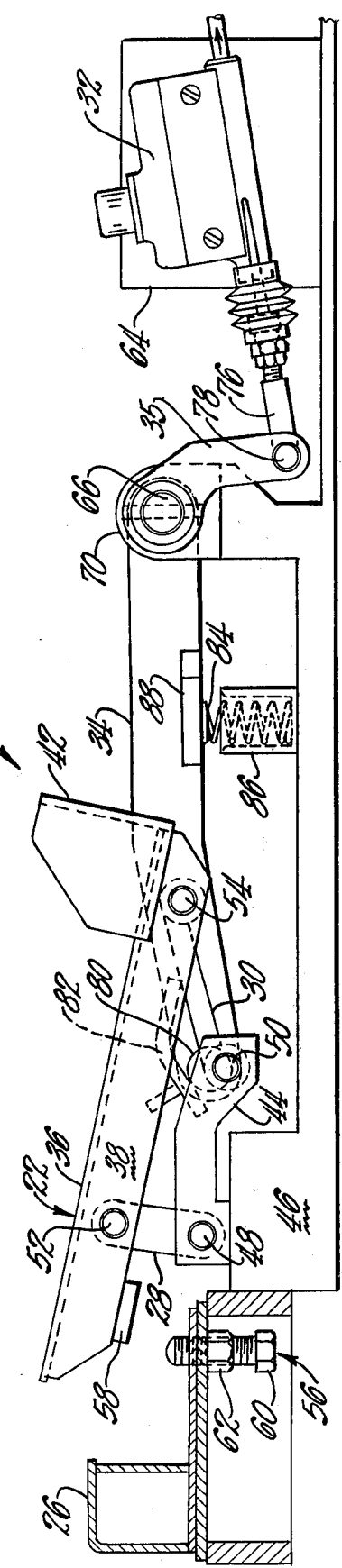

VEHICLE SERVICE BRAKE PEDAL

This invention relates generally to material handling vehicles, and more specifically to a service brake system for a vehicle which is controlled by an operator in a standing position.

In industrial vehicles of this type, safety requirements dictate that the vehicle employ both a service brake and a parking brake, with the parking brake automatically operable when the operator leaves the vehicle. In prior art stand-up vehicles the practice has been to provide an operator's platform comprising two large pedals. The parking brake pedal is normally in a raised position, corresponding to an actuated position of the brakes, so that when the operator is in position standing on the platform, the brakes are released. The service brakes are generally set up in the same way, with the pedal spring-loaded in an up position engaging the brakes and pressed down by the operator to release the brakes. The service brakes can also be set up in a normally up position corresponding to a released condition of the brakes. The service brakes are either mechanically or hydraulically actuated, and the parking brake is mechanically actuated.

When the service brake is set up so that the pedal is raised to apply the brake, the braking force is necessarily provided by a spring, effectively taking away some of the operator's control of the braking force applied. When the service brake pedal is pushed down to apply the brake, the operator must either stand with both feet to one side of the vehicle on the parking brake pedal, or with one foot raised over the raised service brake pedal in position to operate the brake as required. Either way, it is difficult under normal operating conditions for the operator to stand in a normal manner with his feet spread comfortably apart, and with his weight comfortably distributed on both feet.

Furthermore, where the service brakes are of a type wherein the pedal is released to apply the brakes, the service and parking brakes must be interconnected so that the hydraulic pressure in the service brake system is released when the mechanical parking brake is applied. To accomplish this a dumping valve must be introduced into the system to relieve pressure in the service brake system when the parking brakes are applied, and to allow the service brake system to be repressurized every time the vehicle is reoccupied. It can be appreciated that elimination of such a valve is desirable from the standpoint of both cost and reliability.

In accordance with the above, an object of the present invention is to provide a service brake system for a stand-up industrial vehicle which permits the operator to assume a comfortable and normal stance during all phases of vehicle operation.

Another object of the invention is to provide a service brake system in which the actuating pedal is pressed downward to apply the service brake.

Another object of the invention is to provide a service brake in which braking force is controlled entirely by the operator.

Another object of the invention is to provide a service brake which minimizes the time required for an operator to move his foot into position to operate the brake.

To meet the above objectives, the present invention takes advantage of the fact that on the average, a person in a normal standing position has approximately 60% of his weight on his heels, and 40% on the balls of his feet. The invention provides a brake pedal and associated linkage which is normally in a level attitude and which remains level when stood upon in a normal manner, the rear portion of the pedal corresponding to the operator's heel being supported by a suitable stop. When sufficient forward pressure is applied to substantially alter the 60-40 balance, the pedal linkage permits the forward portion of the pedal to depress downward below a level attitude. Through suitable linkage this depression is caused to actuate the operating rod of a conventional hydraulic master cylinder.

The pedal linkage is arranged so that a definite forward and downward pressure must be applied by the ball of the operator's foot in order to move the pedal from its level attitude and operate the brake. Field tests have shown that there is little liklihood of inadvertent brake actuation and once an operator becomes accustomed to not being required to lift his foot as part of the brake application process, it has been found to be a highly practical system.

The pedal linkage comprises a pair of links, both of which are located forward of the point where the operator's heel will rest on the pedal. The links are angled away from each other from their attachment to the frame of the vehicle and an operator's normal weight distribution tends to tilt the pedal backward against a stop to maintain a relatively level attitude of the pedal. When the operator's weight is transferred to the ball of his foot to apply the service brakes, the rear link moves toward an over center position and the forward link moves toward a horizontal position such that essentially the full weight of the operator can be put into braking force applied to a master cylinder linkage.

Other objects and advantages of the invention will become apparent from the specification when taken in connection with the drawings, wherein:

FIG. 3 is a side elevation view of the service brake pedal and brake linkage in its normal position; and FIG. 4 is a view similar to FIG. 3, but showing the service brake pedal and brake linkage in its brake applied position.

Figure 1:
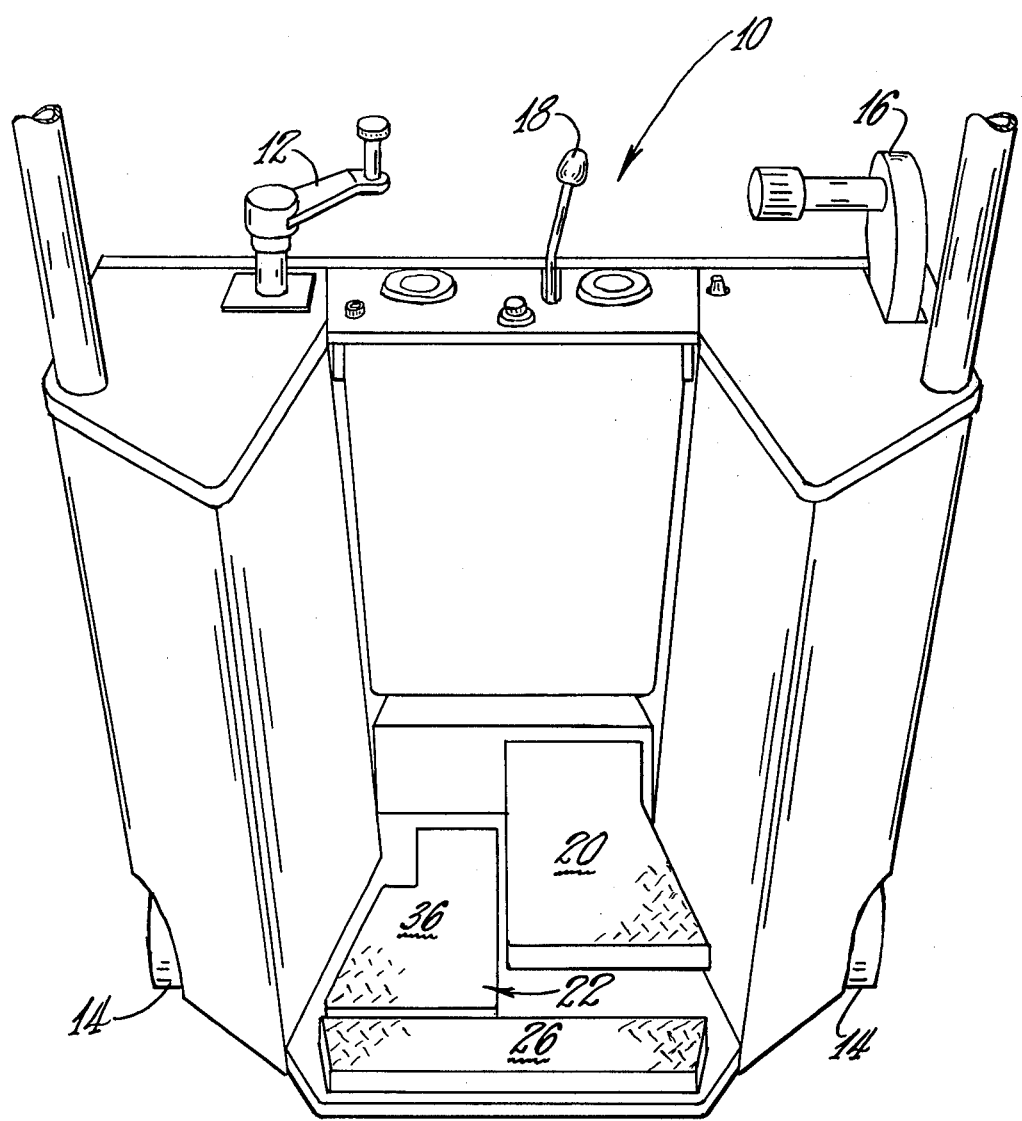
FIG. 1 is a rear perspective view of the operator's station of an industrial vehicle incorporating the invention.

Referring particularly to FIG. 1, there is illustrated the operator's station of a typical stand-up type industrial vehicle, designated generally by the numeral 10. Included at the operator's station are a tiller 12 for steering wheels 14 of the vehicle, a control handle 16 for controlling vehicle travel and for controlling lifting and lowering of a load carriage (not shown) of the vehicle, a control handle 18 for tilting of the load carriage, a parking brake pedal 20, and a service brake pedal 22.

The parking brake system is not important to the present invention and will not be described in detail. The parking brake pedal 20 is shown in its normal position for an unattended vehicle. The pedal is mechanically connected to wheel brakes in a conventional manner, and is pivotally mounted to the vehicle frame, with the rearward end spring-loaded in an up position, corresponding to the actuated condition of the parking brakes. When an operator gets on the vehicle, he steps on the parking brake pedal, releasing the parking brakes through a suitable linkage. For purposes of this invention, it can be assumed that the parking brake system is completely independent of the service brake system.

Figure 2:
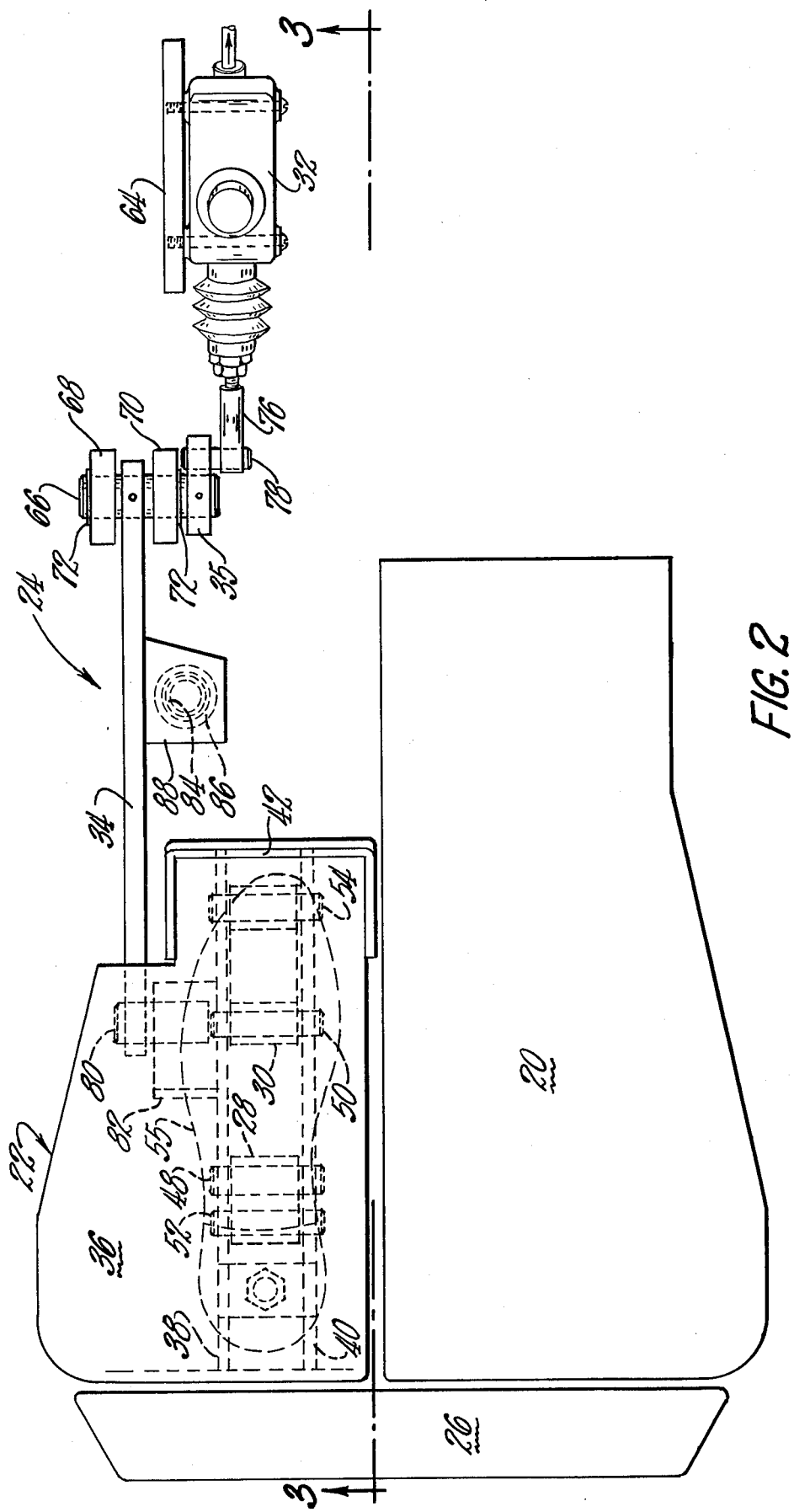
FIG. 2 is a partial plan view, with parts of the vehicle removed for clarity, showing the pedal structure of the invention.

The service brake pedal 22 is part of a service brake system, which is shown in more detail in FIGS. 2, 3 and 4, and designated generally by the numeral 24.

As shown in FIGS. 1, 2 and 3, the service brake pedal 22 normally rests in a level position, generally corresponding to the down position of the parking brake pedal 20, thus forming a flat, level surface for the operator to stand on. A fixed plate 26 extending across the rear of both pedals can be added to further provide a stable base for the operator.

The service brake system 24 essentially comprises the pedal 22, first and second link members 28, 30 supporting the pedal on a section 46 of the vehicle frame, a master cylinder 32, and actuating lever arms 34 and 35, linking the pedal to the master cylinder for actuation of the service brakes. The master cylinder operates in a conventional manner to apply braking force signals to the vehicle's hydraulic service brakes.

The service brake pedal 22 comprises a flat foot plate 36, a pair of longitudinal stiffeners 38, 40 welded or otherwise fastened to the underside of the footplate, and a toe plate 42 welded or otherwise fastened to the top of the foot plate 36. The toe plate 42 is a U-shaped member which is intended to insure that the toe of an operator's shoe will be retained on the pedal, as shown in FIG. 2, when the service brake is actuated, as will be described in more detail later.

Referring particularly to FIGS. 3 and 4, one end of each of the links 28 and 30 is pivotally mounted between a pair of brackets 44 (one of two shown), which are welded or otherwise fastened to the frame 46. The pivot pins 48, 50, respectively, which mount the links to the brackets can be retained by any conventional means, such as by press fitting into the brackets, or by retaining rings.

The opposite ends of the links 28, 30 are similarly pivotally mounted between the stiffeners 38, 40, by means of pivot pins 52, 54 respectively. As illustrated in FIG. 3, upper pivot pin 52 of the link 28 is disposed somewhat rearwardly of lower pin 48, and upper pin 54 of link 30 is disposed somewhat forwardly of lower pin 50 when the pedal is in its brake released position. Also, the forward link 30 is somewhat longer than rearward link 28, and at a greater angle to the vertical. As a result, an effective downward force applied to the pedal 22 forward of upper rear pivot pin 52 will tend to tilt the pedal forward. As more force is applied forward of pin 52, the pedal will also shift forward until the link 28 moves toward an over center position and the pedal assumes the attitude shown in FIG. 4.

As illustrated in FIG. 2, the outline of a typical shoe 55 is shown in broken lines over the pedal 22. It can be appreciated that over a wide range of shoe sizes, the heel of the shoe will rest behind pivot pin 52. The arrow W in FIG. 3 represents the resultant of half the operator's weight. So long as the operator's weight on his one foot is applied to the region over or behind the pin 52, the effective force on the pedal 22 will cause it to tilt rearwardly. Accordingly, a stop 56 is provided which contacts a pad 58 welded or otherwise fastened across the underside of the stiffeners 38, 40.

As illustrated herein, the stop 56 is in the form of a bolt 60, which is threaded through a portion of the vehicle frame 46 and locked in place by means of a locknut 62. As shown, the stop 56 is adjusted to maintain the pedal 22 in a slightly backwardtilted attitude under normal, non-braking conditions, although it can be appreciated that the stop 56 can be adjusted to set the rear end of pedal 22 somewhat above or below a level attitude.

As illustrated herein, the service brake system master cylinder 32 is bolted to a vertical bracket plate 64, which is welded or otherwise fastened to a convenient part of the vehicle frame. The lever arm 34 is pinned at its forward end to a pivot rod 66, which is supported for rotation by bearing members 68, 70 welded or otherwise fastened to a convenient vehicle frame member. As illustrated, the rod 66 is retained longitudinally by means of snap rings 72.

Referring to FIGS. 3 and 4, lever arm 35 is also pinned to the pivot rod 66, thus forming a bellcrank in cooperation with lever arm 34, and is connected at its free end to the actuating rod 76 of master cylinder 32 by means of a pin 78, which can be pivotally received in either or both of the lever arm 35 or the actuating rod 76.

The lever arm 34 is disposed so that its rearward end underlies a portion of the foot plate 36 of pedal 22. A relatively large diameter pin 80 is welded or otherwise rigidly fastened to the arm 34, and has a generally horizontally oriented stub end portion in position to contact a curved cam plate 82 fastened to one side of the stiffener 38. The contact between pin 80 and cam plate 82 occurs approximately beneath the ball of the operator's foot during braking.

A return spring 84, received in a cylindrical retainer 86 attached to a portion of the frame 46 is engageable with a lateral extension 88 of the actuating rod 34 to set the normal, unbraked, position of the service brake pedal 22, in conjuction with the stop 56.

In operation, an operator will normally stand with his heel in the area behind pin 52, thus putting 60 percent of the weight on that foot behind the pin 52, and maintaining the pedal in its normal, substantially level attitude against stop 56. There is sufficient latitude in the size of the pedal and placement of the pivot pins to allow variations in foot placement and some shifting of the weight forward without tending to actuate the service brake.

When braking is required, the operator shifts the weight on his left foot forward toward the ball of his foot, thus shifting the resultant force W applied to the pedal to the right as viewed in FIGS. 3 and 4. When W shifts to some point forward of pivot pin 52, the pedal 22 will move from the position of FIG. 3 to the position of FIG. 4. In so moving, the cam plate 82 forces the pin 80 downward causing the lever arm 35, by virtue of the pinned connection of the arms 34 and 35 to the pivot rod 66, to rotate counterclockwise as viewed in FIGS. 3 and 4, thereby moving the master cylinder actuating rod 76 inward of the cylinder to actuate the service brake. It can be appreciated that in relation to pin 52 the exact point at which W is shifted sufficiently forward to tilt the pedal to its FIG. 4 position will vary from operator to operator.

Once the pedal 22 has been moved and tilted forward far enough to move the rear link 28 toward an over center position (see FIG. 4) virtually all the operator's weight can be applied through the cam plate 82 to the actuating rod 34 for brake actuation. The toe plate 42 further serves to permit full brake actuation force to be applied to the master cylinder 32 without danger of the operator's foot slipping off the pedal 22.

We claim:

1. In a brake system for a vehicle including brake actuator means operable to apply a brake application force signal to the wheel brakes of said vehicle, said vehicle including a frame and an operator's station defined by said frame, said actuator means including an input member movable between a brake released position and a brake applied position: a pedal operatively mounted on said frame within said operator's station, means operatively connecting said pedal to said input member for moving said input member between said brake released position and said brake applied position, and linkage means supporting said pedal for movement between a brake released position and a brake applied position, said linkage means being effective to maintain said pedal in its brake released position when the effective force applied to said pedal is applied to a first region of said pedal and to permit movement of said pedal to its brake applied position when said effective force is applied to a second region of said pedal; said linkage means comprising a first link member having a first end pivotally mounted to the frame of said vehicle and a second end pivotally attached to said pedal at a first angle to the vertical with respect to said first end when said pedal is in said brake released position, and a second link member spaced forward of said first link member and having a first end pivotally attached to the frame of said vehicle and a second end pivotally attached to said pedal at a second angle to the vertical with respect to said first end when said pedal is in said brake released position, said second region of said pedal being located forward of said second end of the first link member.

2. Apparatus as claimed in claim 1, in which said first region of said pedal is located rearward of said second end of said first link member.

3. Apparatus as claimed in claim 1, in which said first link member is oriented at a first angle extending rearwardly of said first end of said first link member when said pedal is in said brake released position, and said second link member is oriented at a secondd angle extending forwardly from said first end of said second link member when said pedal is in said brake released position.

4. Apparatus as claimed in claim 3, in which said second angle is greater than said first angle, shifting of said effective force from said first region to said second region causing the second end of said first link member to shift over center.

5. Apparatus as claimed in claim 1, including a stop member received in the frame member of said vehicle and engageable with said pedal when said effective force is applied to said first region to determine the brake released position of said pedal.

6. Apparatus as claimed in claim 1, in which said means operatively connecting said pedal to said input member comprises a bellcrank having a first leg engageable with said pedal and a second leg pivotally attached to said input member, whereby pivotal movement of said pedal from a brake released position to a brake engaged position is translated into linear movement of said input member.

7. Apparatus as claimed in claim 6, including means acting on said first leg biasing said pedal toward its brake released position.

8. Apparatus as claimed in claim 6, in which a pin member is rigidly received in the free end of said first leg, and said pedal includes a projecting member rigidly attached to said pedal, said projecting member being in sliding contact with said pin member.

9. Apparatus as claimed in claim 8, in which said pin member is positionable to underlie the point of application of the effective force applied to said pedal when said pedal is moved toward its brake applied position.

10. Apparatus as claimed in claim 1, including a generally U-shaped stop member disposed at the front of said pedal and extending upward from said surface of said pedal with its base extending across the forward edge of said pedal and its legs extending along the side edges of said pedal.

* * * * *

UNITED STATES PATENT AND TRADEMARK OFFICE
CERTIFICATE OF CORRECTION

PATENT NO. : 4,061,053
DATED : 12/6/77
INVENTOR(S) : Derek K. Keene; Walter R. Hinde It is certified that error appears in the above–identified patent and that said Letters Patent are hereby corrected as shown below:

Col. 5, line 40:          "secondd" should read "second".

Col. 6, line 10:          Per Amendment A, delete "member" after "frame".

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*